Figures 1, 2:
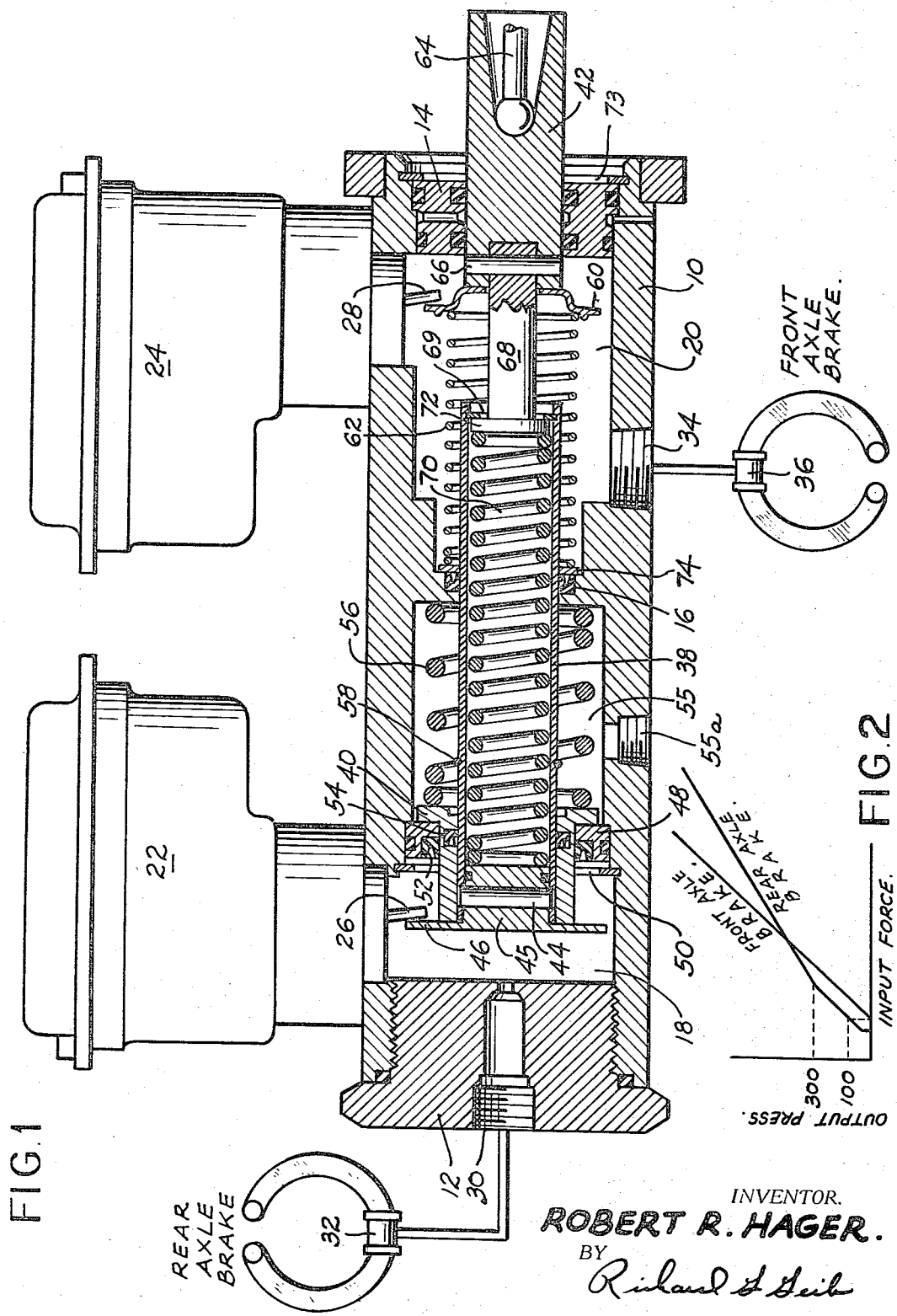

Dec. 12, 1967  R. R. HAGER  3,357,184
BRAKE PROPORTIONING MEANS
Filed Jan. 17, 1966

INVENTOR.
ROBERT R. HAGER.
BY
Richard L. Geib
ATTORNEY.

United States Patent Office 3,357,184
Patented Dec. 12, 1967

3,357,184
BRAKE PROPORTIONING MEANS
Robert R. Hager, South Bend, Ind., assignor to The Bendix Corporation, a corporation of Delaware
Filed Jan. 17, 1966, Ser. No. 521,091
12 Claims. (Cl. 60—54.6)

This invention relates to a fluid pressure system and more particularly to a fluid pressure system having a means to proportion delivery of fluid pressure therefrom. More specifically, this invention is concerned with a hydraulic braking system for vehicles in which a means is provided to proportion braking pressures for the brakes of same.

In that the problem is most acute with regard to vehicle braking systems and that the invention was designed principally for alleviating the problem, the following objects and descriptions are more particularly directed to the solution of this problem. However, it should be realized that such a system as disclosed by this invention could be equally applicable to other fluid pressure systems, for example, the hydraulic system of an aircraft wherein it may be desired to sequentially operate and proportionally provide pressures for one, two or more parts to be controlled by fluid pressure; i.e., single or dual control systems and the like. Furthermore, it is quite possible that such a system as will be hereinafter described, is applicable to the industrial tool area wherein presses are required to be sequentially operated with proportionally varying pressures for the formation of articles.

Getting back to the problem most acutely aware to the inventor, it is because the center of gravity of the vehicle must be of finite distance above the surface upon which the vehicle is traveling that there has been long understood to be a weight shift in the direction of travel when the vehicle is decelerated by means of the brakes. In the past, the proportioning of braking between front and rear brakes has been accomplished by providing a fixed ratio of areas in front and rear wheel cylinders which is roughly proportional to the ratio of weights supported by the front wheels to the weights supported by the rear wheels when the vehicle is being decelerated at about .7 g or in the range of 20–25 ft./sec./sec. Obviously, this compromise is not fully satisfactory, since it provides "optimum" braking at only one road coefficient, and results in premature front wheel slides when the coefficient is less than that for optimum braking, and premature rear wheel slides when the coefficient is greater than that for optimum braking. The prior art attempts to approach an ideal relationship between front and rear braking have introduced valves, pressure boosters, or deboosters, etc., into the system so that the braking ratio will be changed at one or more points. However, such attempts in many instances have been poor approximations of the desired curve. With these thoughts in mind, it is an object of my invention to provide a closer approximation of a desired curve and to provide means whereby the master cylinder itself is modified to provide such a change in braking ratio for the aforesaid purpose.

In other words, it is an object of this invention to provide a master cylinder having a first means to deliver pressurized fluid therefrom and a second means operatively connected thereto to provide a proportioned fluid pressure delivery from the master cylinder.

It is also another object of my invention to provide a still further fluid pressurizing means for the master cylinder that will deliver a second and independent fluid pressure after a development of a first fluid pressure of a certain predetermined level.

To this end, it is another object of this invention to provide a master cylinder having separate hydraulic connections to front and rear brakes, which master cylinder includes a mechanism for first providing a braking pressure to the rear brakes and then providing a braking pressure to the front brakes. These pressures will show a parallel slope on a curve plotting the ratio of output pressure to input force, until a predetermined pressure has been developed whereupon the curves will show a decreased slope for the ratio of output pressure to input pressure of the rear brakes regarding that of the front brakes. In other words, after a predetermined braking pressure is achieved at the rear brakes, the pressures at the front wheels will increase at a proportionally greater rate than at the rear wheels.

A still further object of the present invention is to provide a brake proportioning master cylinder which utilizes a minimum number of parts; is relatively inexpensive to manufacture, is reliable in operation, and is of a strudy, long lasting construction.

The above and other objects and features of this invention will become apparent from the following description of the mechanism taken in connection with the accompanying drawings which form a part of this specification and in which:

FIGURE 1 is a longitudinal section of a dual or split system type master cylinder which incorporates my invention; and FIGURE 2 is a graph showing the relationship of front brake pressure to rear brake pressure provided by a master cylinder such as is illustrated by FIGURE 1.

Referring to FIGURE 1 of the drawings, it will be seen that the master cylinder comprises a housing 10 having a bore therethrough that is closed at one end by a cap 12 and at the other end by a seal 14 and is centrally divided by a partition and seal 16 to separate the bore into a secondary chamber 18 and a primary chamber 20. The housing 10 is provided with openings for the joining therewith of a pair of fluid reservoirs 22 and 24 whose communication to the chambers 18 and 20, respectively, are controlled by means of compensator valves 26 and 28. As seen, the secondary chamber 18 is communicated by means of a port 30 through the cap 12 to a rear wheel cylinder 32, and the primary chamber 20 is communicated by means of a port 34 to a front wheel cylinder 36 forming the rear axle and front axle braking means, respectively, for the vehicle with which the master cylinder is associated.

Internally of the master cylinder there is reciprocably mounted a first fluid pressure increasing means or piston 38, a second fluid pressure increasing means or sleeve 40 and a third fluid pressure increasing means or piston 42 which are arranged as follows:

The first piston 38 is reciprocally extended from the primary chamber 20 to the secondary chamber 18 and is operatively associated with the partition and seal means 16. It is also connected by means of a pin 44 to a piece 45 having a radiating flange 46, which in the released position shown engages and operates the compensator valve 26. The sleeve 40 fits around the end of the means 38 within the chamber 18 and bears against the flange 46. This sleeve is also prevented from moving into the chamber 18 by means of a stop ring 48 attached to the master cylinder housing 10 by means of a snap ring 50. The stop ring 48 and the sleeve 40 are provided respectively with seals 52 and 54 to maintain the integrity of the secondary chamber 18 and prevent the leakage of fluid to a chamber 55 between the primary and secondary chambers. This chamber has a port 55a which, though not shown as such, is normally connected to the reservoir 22 above the fluid level to prevent pressure blockage in chamber 55 due to fluid seepage thereinto. It could be connected to a blow-off valve for similar results. In addition, the sleeve 40 is biased against the stop 48 by means of a heavy spring 56 interposed between the sleeve and the housing 10. This combination allows for an accurate piston return stop to save valuable input stroke losses to close the compensator. The first piston 38 is provided with an annular ring 58 spaced rearwardly from the sleeve 40 a distance that will permit limited rearward movement of the sleeve, as piston 38 is advanced. When sleeve 40 is in contact with ring 58, the ring seats in a groove in the sleeve to prevent it from accidently popping out of its groove on position 38. The third piston 42 is reciprocally inserted into the chamber 20 through the end seal 14 and is provided with a radial flange 60 in the chamber 20 that operates the compensator valve 28 similar to the operation of the compensator valve 26 by the flange 46. In addition, a single return spring 62 for pistons 38 and 42 is inserted between the housing 10 and the flange 60 so as to return the pistons to the position shown by FIGURE 1 whenever force is released from the manual operating means 64. In passing, rod 64 may be connected to a power braking servomotor or a manually operated brake pedal (not shown) whichever is associated with the vehicle. Piston 42 is formed with a recess and a pin 66 is inserted through a radially drilled opening to mount a rod 68. The rod 68 extends forwardly into the tubular piston 38. A snap ring 69 contains a head 72 of rod 68 in the piston 38, and a spring 70 is inserted between the head 72 of the rod and the piece 45 to operatively connect the means 42 and the means 38. This caged condition operates both compensator valves simultaneously thus further saving valuable input travel losses. As seen, a snap ring 73 locates the seal 14 in the rear opening of the bore of the master cylinder housing 10. It should also be mentioned that the spring 62 is prevented from bearing upon the seal 16 by a spring bearing plate 74 that is arranged to operatively abut the housing 10 on a shoulder thereof behind the seal. With plate 74 being so positioned, it acts as a stripper for seal 16 in case this seal should try to seize the piston 38 on return. Any pressure in bore 20 will assist this function.

In operation, the rod 64 is moved inwardly of the master cylinder, such as by depressing the vehicle brake pedal, so as to displace the means 38 inwardly of the cylinder 18 and projected from the chamber 20. At the same time the means 42 is being projected inwardly of the chamber 20, but as the effective area of the means 38 and the means 42 is equal, no fluid will be displaced in the chamber 20 and consequently no pressure will be generated.

After a predetermined pressure has been developed in the chamber 18, in a preferred embodiment this would be about 100 p.s.i., the spring 70 then yields to permit relative motion between the means 38 and the means 42 in the chamber 20 to thereafter develop pressure and displace fluid from the chamber 20. The increased pressure of chamber 20 is applied to means 38 to increase the pressure of chamber 18 at the same rate. In the preferred form of the master cylinder constructed, at 300 p.s.i. in the secondary chamber 18, the pressure on the means 40 will overcome the spring 56 to project it rearwardly until this sleeve-like piston 40 abuts the ring 58 on the piston 38 to, in effect, create an enlarged plunger for the secondary chamber 18. As the sleeve 40 is backing out of chamber 18, piston or means 38 moves further in to compensate for the volume loss by reason of pressure in chamber 20 and force in spring 70. Thus, the pressure developed by chamber 18 will fall behind that of chamber 20 which can be generally shown by the curve of FIGURE 2 with chamber 18 relating to the rear axle and chamber 20 relating to the front axle. As seen in FIGURE 2, the secondary chamber produces a curve of a different slope showing a pressure increase that is proportionally below the pressure increase from the primary chamber 20. The master cylinder, therefore, provides a compensator for reduced effectiveness of rear brakes at higher decelerations (which occurs at higher pressure). Having fully described the objects realized thus far to me and the manner of construction of preferred form of my invention, I now wish to set forth the scope of protection sought by this patent in the following claims.

I claim:
1. In a fluid pressure system, a fluid pressure developing cylinder including a means to proportion the displacement of a fluid therefrom comprising:
   a first fluid pressure developing means in said cylinder;
   a second fluid pressure developing means concentric with said first means;
   a first stop means in said cylinder arranged to locate a forward face of said second means adjacent a forward face of said first means;
   a second stop means on said first means to limit the rearward motion of said second means with respect to said first displacing means; and
   a resilient means biasing said second means against said first stop means in opposition to fluid pressure in said master cylinder created by said first means which upon yielding to fluid pressure permits telescoping of said first and second pressure developing means to maintain the pressure developed until said second stop means picks up said second means to thereafter move said first and second means in unison in said cylinder so that pressure buildup is more gradual.

2. A cylinder according to claim 1 which is further characterized as having a bore with said first means dividing said bore into first and second variable volume chambers, with said first means being operatively connected to a third pressure developing means within said cylinder therebehind, said first means being operable in both said first and second variable volume chambers, and said third means being operable in said second variable volume chamber.

3. A cylinder according to claim 2 wherein the effective area of said first and third means is equal so that pressure in said second variable volume chamber is only developed when said third means moves relative to said first means in said second chamber.

4. A cylinder according to claim 3 and further comprising a spring having a predetermined spring load to prevent relative motion between said first and third displacing means until a pressure is developed of a predetermined magnitude in said first variable volume chamber.

5. A fluid pressure system according to claim 4 including a first port open to said first chamber and a second port open to said second chamber connected respectively to separate parts to be operated by fluid pressure.

6. A fluid pressure system according to claim 5 characterized as a hydraulic brake system wherein said first port is connected to a rear axle brake means and said second port is connected to a front axle brake so that braking operation is sequential and proportional.

7. A fluid pressure system according to claim 6 and further comprising:
   a constant chamber between said variable volume chambers in which said resilient means is located; and
   a means to operate said master cylinder.

8. A master cylinder according to claim 2 comprising a spring connection arranged between said first and third pressure developing means so that pressure is developed by said first means before pressure is developed by said third means and after yielding permits equal pressures to be developed by said means up to a predetermined value whereupon said resilient means yields to decrease the pressure developed by said first means as compared with that developed by said third means.

9. A master cylinder according to claim 1 comprising in addition a means to return said first and third means to their released position wherein first means is abutting said second means so that said second means provides a return stop upon releasing of a means operating same.

10. A master cylinder according to claim 1 and further comprising a means to supply a hydraulic fluid to said master cylinder that is operatively connected to said first fluid displacing means.

11. A master cylinder according to claim 2 and further comprising a first means to supply a hydraulic fluid to said first chamber and a second means to supply a hydraulic fluid to said second chamber which means are respectively operatively connected to said first pressure developing means and said third pressure developing means.

12. A master cylinder according to claim 7 and further comprising a first means to supply a hydraulic fluid to said second chamber which means are respectively operatively connected to said first means and said third means.

No references cited.

MARTIN P. SCHWADRON, *Primary Examiner.*
ROBERT R. BUNEVICH, *Examiner.*